US008592545B2

(12) United States Patent
Mackinnon et al.

(10) Patent No.: US 8,592,545 B2
(45) Date of Patent: Nov. 26, 2013

(54) POLYMER AND POLYMER COMPOSITIONS

(75) Inventors: Iain A. Mackinnon, Penarth (GB); Sarah O'Hare, Nr. Barry (BE); Francois De Buyl, Hoeilaart (BE); Geraldine Durand, Messas (GB)

(73) Assignee: Dow Corning Corporation, Midland, MI (US)

( * ) Notice: Subject to any disclaimer, the term of this patent is extended or adjusted under 35 U.S.C. 154(b) by 82 days.

(21) Appl. No.: 12/597,783

(22) PCT Filed: Apr. 30, 2008

(86) PCT No.: PCT/EP2008/055369
§ 371 (c)(1),
(2), (4) Date: Jan. 7, 2010

(87) PCT Pub. No.: WO2008/132236
PCT Pub. Date: Nov. 6, 2008

(65) Prior Publication Data
US 2010/0168309 A1    Jul. 1, 2010

(30) Foreign Application Priority Data
May 1, 2007    (GB) .................................. 0708347.0

(51) Int. Cl.
*C08G 77/18* (2006.01)
(52) U.S. Cl.
USPC ................... 528/14; 528/17; 528/18; 528/21; 528/29; 525/477
(58) Field of Classification Search
USPC ....................... 528/29, 21, 14, 17, 18; 525/477
See application file for complete search history.

(56) References Cited

U.S. PATENT DOCUMENTS

| | | | |
|---|---|---|---|
| 3,565,845 A | 2/1971 | Johnson | |
| 3,620,821 A | 11/1971 | Johnson | |
| 4,546,018 A * | 10/1985 | Ryuzo et al. | 427/407.2 |
| 4,707,531 A * | 11/1987 | Shirahata | 528/12 |
| 4,824,651 A | 4/1989 | Frey et al. | |
| 4,837,274 A * | 6/1989 | Kawakubo et al. | 525/100 |
| 4,853,474 A | 8/1989 | Bahr et al. | |
| 4,879,142 A | 11/1989 | Fey et al. | |
| 4,906,707 A * | 3/1990 | Yukimoto et al. | 525/403 |
| 4,910,255 A * | 3/1990 | Wakabayashi et al. | 525/100 |
| 5,070,175 A * | 12/1991 | Tsumura et al. | 528/12 |
| 5,227,410 A | 7/1993 | Eckberg et al. | |
| 5,240,971 A | 8/1993 | Eckberg et al. | |
| 5,767,219 A * | 6/1998 | Takarada et al. | 528/29 |
| 5,811,487 A | 9/1998 | Schulz, Jr. et al. | |
| 5,840,800 A * | 11/1998 | Joffre et al. | 524/806 |
| 6,013,711 A | 1/2000 | Lewis et al. | |
| 6,346,583 B1 | 2/2002 | Kilgour et al. | |
| 6,649,688 B1 | 11/2003 | Mayer et al. | |
| 7,022,800 B2 | 4/2006 | Tachikawa et al. | |
| 8,022,149 B2 * | 9/2011 | Ueda et al. | 525/403 |
| 8,067,519 B2 * | 11/2011 | Maton et al. | 528/12 |
| 2010/0168325 A1 | 7/2010 | Gough et al. | |

FOREIGN PATENT DOCUMENTS

| | | |
|---|---|---|
| DE | 2949725 | 6/1981 |
| DE | 19855125 | 5/2000 |
| DE | 19918361 | 10/2000 |
| EP | 281154 | 9/1988 |
| EP | 281964 | 9/1988 |
| EP | 298402 | 1/1989 |
| EP | 0430476 | 5/1991 |
| EP | 0545660 | 6/1993 |
| EP | 0848029 | 6/1998 |
| EP | 1254192 | 8/2004 |
| JP | 50146645 | 11/1975 |
| JP | 54056655 | 5/1979 |
| JP | 60223860 | 11/1985 |
| JP | 61031416 | 2/1986 |
| JP | 61040352 | 2/1986 |
| JP | 61053376 | 3/1986 |
| JP | 61076345 | 4/1986 |
| JP | 61188406 | 8/1986 |
| JP | 62112647 | 5/1987 |
| JP | 1006042 | 1/1989 |

(Continued)

OTHER PUBLICATIONS

Abstract: JP50128767, Glass fiber reinforced epoxy resin laminate—using e.g. (gamma)—glcidoxypropyl-trimethoxy-silane and polyvinyl alcohol binders, Shin-Kobe Elec KK, Oct. 11, 1975.
Cretich, Marina et al., Electroosmotic flow suppression in capillary electrophoresis: Chemisorption of trimethoxy silane-modified polydimethylamide, Electrophoresis (2005), 26(10), 1913-1919.
Darensbourg, Donald J., et al., The copolymerization of carbon dioxide and {2-(3,4-epoxycyclohexyl)ethyl} trimethoxy silane catalyzed by (Salen)CrCl. Formation of a CO2 soluble, Inorganic Chemistry (2003), 42(15), 4498-4500polycarbonate.
Sun, Y. H. et al., Synthesis and characterization of non-fouling polymer surfaces: I. Radiation grafting of hydroxyethyl methacrylate and polyethylene glycol methacrylate onto Silastic J., Bioact. Compat. Polym., 1(3), 316-34.

(Continued)

*Primary Examiner* — Margaret Moore
(74) *Attorney, Agent, or Firm* — Alan Zombeck

(57) ABSTRACT

A polyorganosiloxane polyoxyalkylene block copolymer having one or more polyorganosiloxane blocks and one or more polyoxyalkylene blocks linked to each other via divalent radicals which comprises at least two silicon-bonded alkoxy groups, preferably of the form PS (A PO)$_m$ (A PS)$_n$, wherein PO is a polyoxyalkylene block, PS represents a polyorganosiloxane block, A is a divalent radical, m and n have independently a value of at least 1, comprising at least one alkoxy-substituted siloxane unit of the formula (R')$_q$(OR)—SiO$_{3-q/2}$, wherein R represents an alkyl group having 1 to 4 carbon atoms and each R' represents an alkyl group having 1 to 6 carbon atoms, a phenyl group, or an alkoxy group of the formula —OR and q has a value of 0, 1 or 2, provided at least two silicon-bonded groups OR are present in the block copolymer. Also provided is a curable composition of the above which may comprise a condensation catalyst and a hydrophilic polymer network made from curing the composition in the presence of moisture, which exhibit interesting reversible hydrophilic properties.

7 Claims, No Drawings

(56) References Cited

FOREIGN PATENT DOCUMENTS

| JP | 7094310 | 4/1995 |
|---|---|---|
| JP | 11021354 | 1/1999 |
| JP | 2001106781 | 4/2001 |
| JP | 2007238820 | 9/2007 |
| WO | WO 200149774 | 7/2001 |
| WO | 2004/096887 | * 11/2004 |

OTHER PUBLICATIONS

Vitry, Solweig, et al., Hybrid copolymer latexes crosslinked with methacryloxy propyl trimethoxy silane, film formation and mechanical properties, Comptes Rendus Chimie (2003), 6(11-12), 1285-1293.

* cited by examiner

POLYMER AND POLYMER COMPOSITIONS

CROSS REFERENCE TO RELATED APPLICATIONS

This application is a U.S. national stage filing under 35 U.S.C. §371 of PCT Application No. PCT/EP2008/055369 filed on 30 Apr. 2008, currently pending, which claims the benefit of Patent Application No. GB 0708347.0 filed 1 May 2007 under 35 U.S.C. §119 (a)-(d) and 35 U.S.C. §365(a). PCT Application No. PCT/EP2008/055369 and Patent Application No. GB 0708347.0 are hereby incorporated by reference.

This invention relates to novel silicone polymers, to a curable composition comprising said polymers and to a water-insoluble hydrophilic polymer network made from said curable composition and having unusual surface properties. The invention also relates to a method of preparing such polymers and polymer networks.

Polyorganosiloxane compositions generally have a low surface energy and are hydrophobic. For some uses of polyorganosiloxane compositions, a hydrophilic polymer is required to give improved wetting of a polymer surface by an aqueous liquid contacting the surface, while retaining some of the advantageous properties of the polyorganosiloxane.

JP-A-2001-106781 describes a silane modified polyether obtained by reacting a polyoxyalkylene glycol with a silicate compound, optionally in the presence of an ester exchange catalyst. The product is moisture curable and useful as a sealant or adhesive.

JP-2007-238820 relates to a hydrophilic organopolysiloxane cured product and its application in coating to provide superior self-cleaning, antistatic, antifouling and low contamination properties. They are based on organopolysiloxane having at least 2 silanol groups and a hydrophilic group, with the silanol groups capable of condensation reaction to form the cured product.

It has now been surprisingly found by the inventors that the use of polyorganosiloxane polyoxyalkylene block copolymers, where the polyoxyalkylene is reacted into the backbone of the copolymer, is particularly useful for the reaction into polymer networks via condensation reaction, which networks exhibit hydrophilic properties. The block copolymers are also found to be novel in their own right.

The invention accordingly provides in a first aspect a polyorganosiloxane polyoxyalkylene block copolymer having one or more polyorganosiloxane blocks and one or more polyoxyalkylene blocks linked to each other via divalent radicals which comprises at least two silicon-bonded alkoxy groups.

Preferably the polyorganosiloxane polyoxyalkylene block copolymer according to the invention is of the form PS-(A-PO)$_m$-(A-PS)$_n$, wherein PO is a polyoxyalkylene block, PS represents a polyorganosiloxane block, A is a divalent radical, m and n have independently a value of at least 1, comprising at least one alkoxy-substituted siloxane unit of the formula (R)$_q$(OR)—SiO$_{3-q/2}$, wherein R represents an alkyl group having 1 to 4 carbon atoms and each R' represents an alkyl group having 1 to 6 carbon atoms, a phenyl group, or an alkoxy group of the formula —OR and q has a value of 0, 1 or 2, provided at least two silicon-bonded groups OR are present in the block copolymer.

It is particularly preferred that the polyorganosiloxane polyoxyalkylene block copolymer is such that the terminal PS blocks represent a polyorganosiloxane block terminated with an alkoxy-substituted siloxane unit which is linked via oxygen to another silicon atom of the PS block and which has the formula

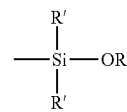

wherein R and R' are as defined above. In other words, it is preferred that the alkoxy-substituted siloxane units forms part of a PS block. It is also preferred that at least two separate silicon atoms in the block copolymer are substituted with at least one silicon-bonded alkoxy group OR.

The blocks (A-PO) and (A-PS) of the preferred block copolymer, may be randomly distributed throughout the block copolymer. The values of m and n may be any value, preferably however no more than 100, more preferably no more than 20, most preferably no more than 5. It is particularly preferred that m and n are 1. Each R' preferably denotes an alkoxy group —OR. Particularly preferred polyorganosiloxane polyoxyalkylene block copolymers have the formula PS-(A-PO-A-PS)$_n$, where PO, PS, A and n have the definitions provided above.

The preferred polyorganosiloxane polyoxyalkylene block copolymer according to the invention generally comprises at least two polyorganosiloxane blocks and at least one polyoxyalkylene block. The alkoxy group substituted siloxane units, which will form cross-linkable reactive groups X for making of the hydrophilic polymer networks according to another aspect of this invention, are most preferably terminal siloxane units of the polyorganosiloxane polyoxyalkylene block copolymer, although this is not essential. The cross-linkable reactive alkoxy group X may however be situated in any siloxane unit in the block copolymer, including those of any polyorganosiloxane block of the block copolymer.

Alternatively the polyorganosiloxane polyoxyalkylene block copolymer has the form PO-(A-PS)$_m$-(A-PO)$_n$ or the form PO-(A-PS-A-PO)$_n$ wherein PO, PS, A, m and n are as defined above. These block copolymers may still have one or more groups X which are located on the PS moiety, which would then clearly not be at the terminal position of the block copolymer. Alternatively the siloxane units comprising the X group would be located at the end of the PO block. These block copolymers are however less preferred for use in the hydrophilic polymer networks according to another aspect of the invention.

The PS blocks comprise siloxane units of the general formula $$R''_rSiO_{(4-r/2)}$$

wherein R" represents OR, alkyl, aryl, alkaryl or aralkyl preferably having from 1 to 18 carbon atoms and r denotes a value of from 0 to 3. Particularly preferred in addition to being OR, R" is an alkyl groups having from 1 to 6 carbon atoms or a phenyl group, although more preferred such R" denotes an alkyl group having from 1 to 3 carbon atoms, most preferably methyl. It is preferred that only up to 4 R" groups in the block copolymer denote OR groups, more preferably only 2, and these being most preferably present on the terminal silicon atoms of the block copolymer, which means that for the preferred block copolymers only the terminal PS blocks would have at least one silicon-bonded OR group present each. It will be clear to the person skilled in the art that, where the block copolymers are of the type where the PO blocks are terminal, only those R groups in the PS block could be OR which are reacted onto a PS precursor block having at least three hydrogen atoms, if these are reacted in via hydrosilylation of alkoxy containing organosilicon compound with at least one unsaturated aliphatic substituent. The value of r is preferably on average for the PS block between 1.6 and 2.4, most preferably 1.9 to 2.1. However siloxane units where r has a value of 3 will be present as terminal groups, which is particularly desirable for the siloxane units on which a silicon-bonded OR is located. In addition some siloxane units with a value for r of 0 or 1 may also be present, but these are preferably kept to a minimum, such as no more than 2% of the total siloxane units in the PS blocks, as they introduce branching into the PS block.

Most preferred therefore are terminal PS blocks which are polydimethylsiloxane moieties which may be end-blocked by alkoxy substituted siloxane units on one side and which may linked to the divalent linking group A on the other side. Where m and/or n has a value greater than 1, the more central PS block(s) will be linked to an A group on both sides. The number of siloxane units in each PS block is not crucial, and will be selected in view of the desired properties of the block copolymer or the hydrophilic polymer network resulting from it. Preferably the PS block(s) will have from 2 to 200 siloxane units, more preferably from 4 to 40, most preferably from 10 to 30.

The PO block is a polyoxylalkylene block having the general formula $$-(C_sH_{2s}O)_t-$$

where each s independently has a value of from 2 to 6, preferably 2 to 3, and t has a value of from 1 to 100, preferably 4 to 40, more preferably 3 to 10. Where the less preferred block copolymers are used, i.e. those where the PO blocks are terminal, the above general formula for the terminal PO blocks would be $$Q-(C_sH_{2s}O)_t-$$

where Q denotes an end-blocking group for the polyoxyalkylene, for example an alkyl group, a hydroxyl group or an acyl group or a group being or comprising an alkoxy group, including an alkoxy-substituted silane or siloxane group. Examples of the polyoxyalkylene blocks include polyoxyethylene blocks, polyoxypropylene blocks, polyoxyethyleneoxypropylene blocks, polyoxyisopropylene blocks and blocks containing a mixture of the different type of alkylene units as the most preferred. At least 50% of the polyoxyalkylene units in the polyoxyalkylene block are preferably oxyethylene units to give the required hydrophilic properties.

The relative amounts of PS and PO blocks is not limited, but may be adapted to the particular end-use which is envisaged. Where a more hydrophilic nature is desired, a larger proportion by weight of the PO blocks, especially those containing polyoxyethylene units, will be selected as a proportion to the total weight of the block copolymer used in the making of the hydrophilic polymer network. Where hydrophilicity is not needed to the same extent, the proportion by weight of the PO blocks may be smaller, although the composition of the PO block may vary instead, e.g. by providing less polyoxyethylene units therein. The molar ratio of oxyalkylene, for example oxyethylene, units to siloxane units in the polyorganosiloxane polyoxyalkylene block copolymer is preferably in the range 0.05:1 to 0.5:1.

The group A is a divalent radical, linking the PS and PO blocks together. In their simplest form they may be a divalent alkylene group, for example of the general formula $C_sH_{2s}$, where s is a defined above, although preferably may be an alkylene group having from 2 to 10 carbon atoms, for example dimethylene, propylene, isopropylene, methylpropylene, isobutylene or hexylene but they may also be other suitable linking groups between PS and PO blocks. These include for example divalent polyorganosiloxane groups terminated by diorganosilylalkylene units, for example $-C_sH_{2s}-[Si(R^*_2)O]_tSi(R^*_2)C_sH_{2s}-$, wherein R* is as defined above for R" except that here it cannot be an alkoxy group, and s and t are as defined above. A person skilled in the art will recognise that this is a non-limiting example of the group A. The group A is generally defined by the process used to link PO and PS groups together, as will be explained in more detail below. It is preferred that the divalent radical A is without any Si—O—C linkages.

A polyorganosiloxane polyoxyalkylene block copolymer of the form PS-(A-PO)$_m$-(A-PS)$_n$ may be prepared in a hydrosilylation reaction by reacting a polyorganosiloxane having two Si—H groups (i.e. a PS precursor) with a polyether containing two aliphatically, preferably olefinically, more preferably ethylenically unsaturated groups (i.e. a PO precursor), optionally in the presence of a polyorganosiloxane having two aliphatically, preferably olefinically, more preferably ethylenically unsaturated groups, in an amount such that the Si—H groups are present in molar or number excess, at least to some extent, over the aliphatically unsaturated groups when the preferred block copolymers are being made, followed by a further reaction via hydrosilylation of the block copolymer thus obtained (block copolymer intermediate) with alkoxy-functional organosilicon compounds, for example a silane or siloxane group having at least one silicon-bonded alkoxy group and one aliphatically unsaturated group. By aliphatically unsaturated group, we include olefinically and acetylenically unsaturated groups, and in particular ethylenically unsaturated groups, which comprise a moiety which preferably has the formula >CH=CH$_2$, for example a vinyl, allyl or methallyl group. Alternatively, but less preferred is the use of an aliphatically unsaturated group which is selected from an olefinically unsaturated group with the unsaturation being between non-terminal carbon atoms, or the use of an acetylenically unsaturated group, such as an alkynyl group, for example ethynyl or propynyl.

Where the polyorganosiloxane polyoxyalkylene block copolymer of the formula PO-(A-PS)$_m$-(A-PO)$_n$ or PO-(A-PS-A-PO)$_n$ is being prepared, alternatively to the method described above, a mixture could be used of a first polyether which contains two aliphatically, preferably olefinically, more preferably ethylenically unsaturated groups and a second polyether containing only one aliphatically unsaturated group which has an end-blocking group at the other end, such as an alkyl, hydroxyl or acyl group. The second polyether would then form the terminal PO blocks in the block copolymer. However in this case a PS precursor is needed which has at least three silicon-bonded hydrogen atoms, so that the first two can be reacted to form the link with PO blocks via an A radical and the third and subsequent silicon-bonded hydrogens can be further reacted with the alkoxy-group containing organosilicon compound. Where only the first polyether is used, the alkoxy functionality can be provided as indicated above, or alternatively by reacting the aliphatically unsaturated group available on the terminal PO blocks with an organosilicon compound having at least one alkoxy substituent, provided said organosilicon compound has instead of an aliphatically unsaturated substituent a silicon-bonded hydrogen atom to react with the aliphatically unsaturated end group of the PO block via addition reaction.

The reaction between the PS precursors and the PO precursors and, for the more preferred block copolymer, the final reaction with the alkoxy substituted organosilicon compound is generally carried out in the presence of a hydrosilylation catalyst such as a platinum group metal or a complex or compound thereof, for example platinum, rhodium and complexes or compounds thereof. The divalent radicals A resulting from such preferred hydrosilylation reaction are alkylene radicals, having for example 2 to 6 carbon atoms depending on the aliphatically unsaturated group of the polyether used, or a α,ω-alkylene-endblocked polydiorganosiloxane, depending on the polyorganosiloxane having aliphatically unsaturated groups which was used.

Where a preferred polyorganosiloxane polyoxyalkylene block copolymer of the form PS-(A-PO-A-PS)$_n$ is to be prepared, the process described above can be used, and the α,ω-alkylene-endblocked polydiorganosiloxane may be left out. If it is not left out, the chance of random distribution of A groups linking PS to PO and PS to PS cannot be easily controlled. However, polymers made according to either formula PS-(A-PO)$_m$-(A-PS)$_n$ or PS-(A-PO-A-PS)$_n$ will be eminently suitable for the curable compositions and for the hydrophilic polymer networks according to other aspects of this invention.

The polyorganosiloxane (PS precursor) which is reacted with the polyether (PO precursor) to form the block copolymer may be branched but is preferably a linear polydiorganosiloxane with a degree of polymerisation (DP) of from 2 to 250 siloxane units, more preferably 2 to 200, even more preferably 4 to 40 siloxane units and most preferably 10 to 30 siloxane units. The organic groups which are substituents of the silicon atoms of the polyorganosiloxane are preferably selected from alkyl groups having 1 to 18, preferably 1 to 6, carbon atoms, and phenyl groups. Most preferably at least 90% of the organic groups attached to Si are methyl groups; for example the polyorganosiloxane is a Si—H functional polydimethylsiloxane. The polyorganosiloxane can contain more than two Si—H groups but this is likely to lead to a branched polyorganosiloxane polyoxyalkylene block copolymer. Most preferably the polyorganosiloxane PS precursor has only two Si—H groups, one at each end of the polydiorganosiloxane chain, so that reaction with the polyether produces a more preferred polyorganosiloxane-terminated block copolymer with reactive Si—H groups situated on the terminal silicon atoms of the intermediate polyorganosiloxane blocks of the block copolymer, as shown in the reaction scheme below, where m is as defined above and p has a value of at least 1, ready for further reaction with the alkoxy substituted organosilicon compounds.

SiH terminated polyorganosiloxane polyoxyalkylene block copolymer

Polyorganosiloxanes having Si—H groups on non-terminal siloxane units, or on both terminal and non-terminal siloxane units, can alternatively be used.

The polyoxyalkylene (PO precursor) is preferably a polyethylene oxide, although a poly(oxyethylene oxypropylene) copolymer having a majority of polyoxyethylene units may be used. The preferred ethylenically unsaturated groups of the polyether can for example be allyl, vinyl, methallyl, hexenyl or isobutenyl groups. One example of a preferred polyether is polyethylene glycol diallyl ether. The polyethylene oxide preferably has a D.P. of from 4 to 100, more preferably 4 to 40 oxyethylene units.

For the making of the more preferred block copolymers, the Si—H functional polyorganosiloxane (PS precursor) and the polyether containing aliphatically unsaturated groups (PO precursor) are preferably reacted at a molar ratio of Si—H groups to aliphatically, most preferably ethylenically unsaturated groups in the range 1.5:1 to 6:1, more preferably 2:1 to 4:1. The reaction can be carried out at ambient temperature but an elevated temperature in the range 60 to 200° C., for example 100 to 150° C., may be preferred. The reaction is generally carried out in the presence of a catalyst comprising a platinum group metal such as platinum or rhodium or a complex or compound thereof. One preferred platinum catalyst is hexachloroplatinic acid or a reaction product of chloroplatinic acid and an organosilicon compound containing terminal aliphatic unsaturation; another is a platinum divinyl tetramethyl disiloxane complex. The catalyst is preferably used in amounts from 0.00001-0.5 parts platinum or rhodium per 100 weight parts of the SiH-functional polyorganosiloxane, most preferably 0.00001-0.002 parts.

In addition to the hydrosilylation catalyst, particularly where it is a platinum based catalyst a suitable hydrosilylation catalyst inhibitor may be required. Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by refer-

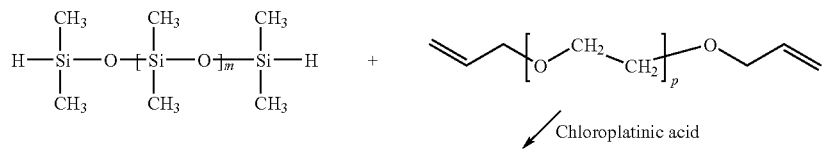

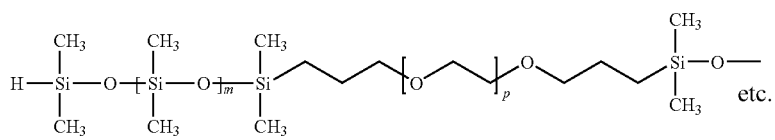

ence to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Where Si—H functional polyorganosiloxane (PS precursor) and the polyether containing aliphatically unsaturated groups (PO precursor) are reacted using a molar excess of the polyether containing the unsaturated groups, for example at a molar ratio of Si—H groups to unsaturated groups in the range 1:1.5 to 1:6, a block copolymer intermediate of the form PO-(A-PS-A-PO)$_n$ or PO-(A-PS)$_m$-(A-PO)$_n$ in which PO, PS, A, m and n are defined as above and the PO blocks have terminal aliphatically, preferably ethylenically unsaturated groups, is produced.

When the more preferred polyorganosiloxane polyoxyalkylene intermediate block copolymers have been prepared as described above, they would then be further reacted with an organosilicon compound having at least one silicon-bonded alkoxy group and one aliphatically unsaturated group in order to obtain polyorganosiloxane polyoxyalkylene block copolymers according to the invention. This would ensure that the alkoxy group(s) would end up in the desired location, which for the most preferred block copolymers would be on the terminal silicon atoms of the block copolymer. Where the less preferred block copolymers have been prepared, having terminal PO units with aliphatically unsaturated end-groups, they would be further reacted with an organosilicon compound having at least one silicon-bonded alkoxy group and one silicon-bonded hydrogen atom.

The Si—OR containing organosilicon groups which can be reacted with the block copolymer intermediates as prepared above may be a compound containing an ethylenically unsaturated group or an Si—H group, thus having the general formula

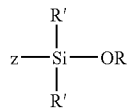

where Z is an aliphatically, preferably ethylenically unsaturated group such as vinyl, allyl, isobutenyl or 5-hexenyl, hydrogen or a polydiorganosiloxane group having an aliphatically, preferably ethylenically unsaturated substituent or a hydrogen atom to the terminal silicon atom. Examples of such organosilicon groups include silanes such as vinyl trimethoxysilane, allyl trimethoxysilane, methylvinyldimethoxysilane, hydrotrimethoxysilane and hydromethyldimethoxysilane. Suitable siloxane organosilicon compounds include vinyldimethyl end-blocked polydimethylsiloxane with a trimethoxysiloxane end-group.

A polyorganosiloxane polyoxyalkylene block copolymer containing more than two Si-bonded alkoxy groups is a self-cross-linkable polymer which can cure to a water-insoluble hydrophilic polymer network as described below. An example of such a block copolymer is a polyorganosiloxane polyoxyalkylene block copolymer terminated with

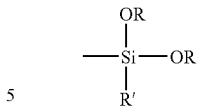

units where R and R' are defined as above, for example a block copolymer of the form PS-(A-PO-A-PS)$_n$ in which the reactive

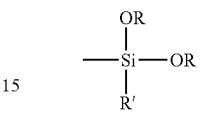

units are situated on the terminal silicon atoms of the polyorganosiloxane blocks.

The polyorganosiloxane polyoxyalkylene block copolymer containing Si-bonded alkoxy groups can alternatively be a block copolymer of the form PO-(A-PS-A-PO)$_n$. Such a block copolymer would be an intermediate having terminal ethylenically unsaturated groups and can be prepared as described above, which would then be reacted with a silane of the formula

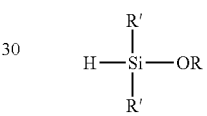

in which R and R' are defined as above, to convert the ethylenically unsaturated groups into reactive groups of the formula

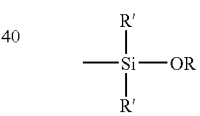

containing 1, 2 or 3 reactive alkoxy groups each attached to a silicon atom in the polyorganosiloxane polyoxyalkylene block copolymer according the first aspect of the invention. Examples of such silanes are trimethoxysilane, triethoxysilane, methyldiethoxysilane and dimethylethoxysilane. Particularly preferred are trialkoxysilanes.

The invention provides in a second aspect a polymer composition curable to a water-insoluble hydrophilic polymer network, said composition comprising a polyorganosiloxane polyoxyalkylene block copolymer according to the first aspect of the invention, i.e. having at least two reactive silicon bonded alkoxy groups X and optionally also containing an organosilicon cross-linking agent having at least two alkoxy groups Y, preferably also silicon-bonded, reactive with the said groups X by condensation reaction, provided that if the polyorganosiloxane polyoxyalkylene block copolymer has only two reactive groups X per molecule the organosilicon cross-linking agent is present and has on average more than two reactive silicon-bonded alkoxy groups Y per molecule.

The polyorganosiloxane polyoxyalkylene block copolymer according the first aspect of the invention, produced as described above can be reacted with an organosilicon cross-linking agent having at least two silicon-bonded alkoxy groups Y reactive with the groups X of the polyorganosiloxane polyoxyalkylene block copolymer via condensation. If the polyorganosiloxane polyoxyalkylene block copolymer has only two reactive groups X per molecule, the cross-linking agent generally has on average more than two reactive groups Y per molecule, for example 2.5 to 6 reactive groups per molecule, to aid network formation (cross-linking) rather than only chain extension, which is required for the formation of the hydrophilic polymer network described below. For example, if the organosilicon cross-linking agent is a branched polyorganosiloxane containing at least three reactive groups Y, it can become bonded to at least 3 polymer chains resulting from the block copolymers of the first aspect of the invention.

The reactive groups X on the polyorganosiloxane polyoxyalkylene block copolymer can for example be present in siloxane units of the formula

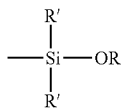

wherein R represents an alkyl group having 1 to 4 carbon atoms and each R' represents an alkyl group having 1 to 6 carbon atoms, a phenyl group, or an alkoxy group of the formula —OR. Examples of such groups are trimethoxysilyl, triethoxysilyl, methyldiethoxysilyl, methyldimethoxysilyl, dimethylmethoxysilyl and dimethylethoxysilyl.

The organosilicon cross-linking agent, when used is preferably a polysiloxane. The polysiloxane can for example consist of siloxane units selected from Q units of the formula $(SiO_{4/2})$, T units of the formula $R^cSiO_{3/2}$, D units of the formula $R^b{}_2SiO_{2/2}$ and M units of the formula $R^a{}_3SiO_{1/2}$, wherein the $R^a$ $R^b$ and $R^c$ substituents are selected from alkyl and alkoxy groups having 1 to 6 carbon atoms, at least three $R^a$, $R^b$ and/or $R^c$ substituents being alkoxy units.

If the polyorganosiloxane polyoxyalkylene block copolymer is a block copolymer of the form PS-(A-PO-A-PS)$_n$ in which the reactive Si—OR groups X are situated on the terminal silicon atoms of the polyorganosiloxane blocks, one suitable type of cross-linking agent is a branched polyorganosiloxane having silicon-bonded alkoxy groups Y situated on at least 3 branches. Such a branched polyorganosiloxane generally comprises Q and/or T units, M units and optionally D units. The alkoxy groups are preferably present in M units.

The polyorganosiloxane can for example be a branched siloxane comprising one or more Q units of the formula $(SiO_{4/2})$, from 0 to 250 D units of the formula $R^b{}_2SiO_{2/2}$ and M units of the formula $R^aR^b{}_2SiO_{1/2}$, wherein the $R^a$ and $R^b$ substituents are selected from alkyl and alkoxy groups having 1 to 6 carbon atoms, at least three $R^a$ substituents in the branched siloxane being alkoxy groups. If the polyorganosiloxane polyoxyalkylene block copolymer is of relatively high chain length, a low molecular weight Q-branched siloxane cross-linking agent may be preferred, for example an alkoxy-functional Q-branched siloxane comprising a Q unit, four trialkoxysilyl M units, for example trimethoxysilyl M units and 0 to 20 dimethylsiloxane D units, which may have the formula

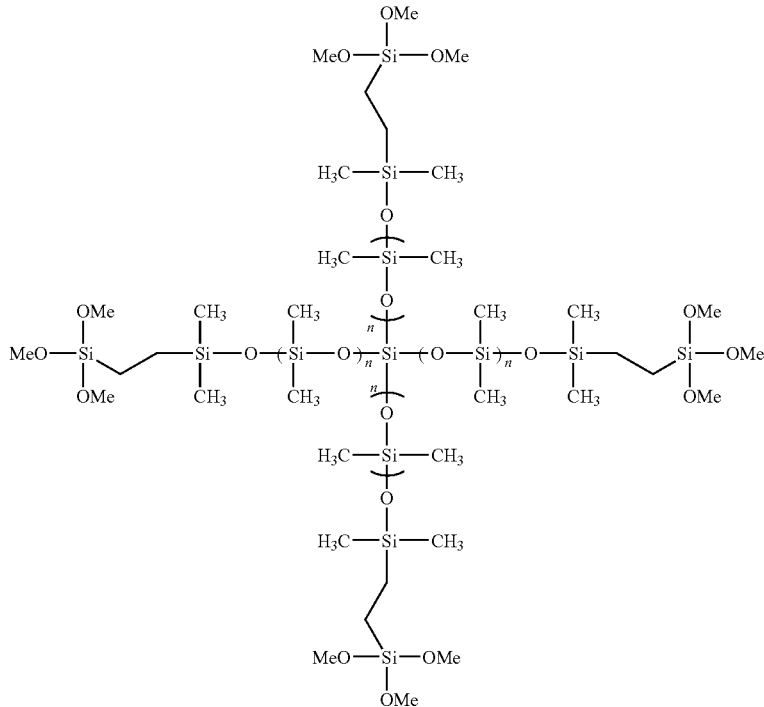

If the polyorganosiloxane polyoxyalkylene block copolymer contains more than two Si—OR groups, for example a block copolymer end-blocked by one or two siloxane units having at least 3 silicon-bonded alkoxy groups or two siloxane units each having at least 2 silicon-bonded alkoxy groups or a rake copolymer containing 3 or more Si—OR groups, the organosilicon cross-linking agent need not contain more than 2 silicon-bonded alkoxy groups. For example the cross-linking agent can be a polydiorganosiloxane containing 2 silicon-bonded alkoxy groups such as a dimethylmethoxysilyl-terminated polydimethylsiloxane, or can be a mixture of such a polydiorganosiloxane containing 2 silicon-bonded alkoxy groups with a branched polyorganosiloxane having silicon-bonded alkoxy groups Y situated on at least 3 branches. Most preferred however, if the polyorganosiloxane polyoxyalkylene block copolymer has more than 2 silicon-bonded alkoxy groups is that the organosilicon cross-linking agent is not used at all.

Usually it is preferred that the cross-linking agent, if used, for provision of reactive Si-bonded alkoxy groups Y is an organopolysiloxane, for example a polydiorganosiloxane such as polydimethylsiloxane having end units of the formula

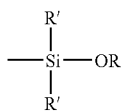

particularly such end units where at least one of the R' groups is an alkoxy group, or a branched polyorganosiloxane in which each branch is terminated with a group of the formula

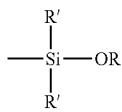

The cross-linking agent of the curable composition where the polyorganosiloxane polyoxyalkylene block copolymer is terminated with reactive groups of the formula

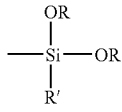

can alternatively or additionally comprise a branched polyorganosiloxane containing

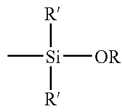

groups, where R and R' are defined as above. The branched polyorganosiloxane can for example be a Q-branched polysiloxane in which each branch is terminated with a

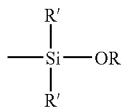

group. Such branched polyorganosiloxanes can be formed by the reaction of an ethylenically unsaturated branched polyorganosiloxane, for example the vinyl-functional Q-branched siloxane described above, with a short chain polysiloxane containing a Si—H group and a group of the formula

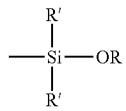

for example a polysiloxane of the formula

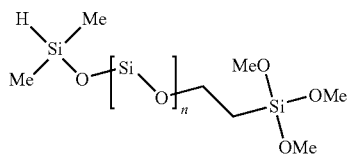

in the presence of a platinum group metal catalyst. The branched polyorganosiloxane cross-linking agent can alternatively be prepared from a branched polyorganosiloxane containing Si—H groups, for example a Q-branched polysiloxane having terminal dimethylhydrogensilyl groups, with an ethylenically unsaturated alkoxysilane of the formula

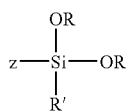

where each R, R' and Z is as defined above. It may be preferred to use a mixture of an alkoxy-terminated polydiorganosiloxane with an alkoxy-terminated Q-branched polysiloxane.

The cross-linking agent, if used, can also be prepared by a hydrosilylation reaction. For example, a Si—H terminated polyorganosiloxane can be reacted with an ethylenically unsaturated alkoxysilane. Alternatively a polyorganosiloxane containing ethylenically unsaturated groups can be reacted with a polysiloxane containing a Si—H group and at least one Si-alkoxy group.

The reactive groups Y on the cross-linking agent can also be present in silane or siloxane units of the formula

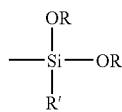

wherein R and R' have the meanings given above. In its simplest form the cross-linking agent can be a trialkoxysilane, for example an alkyltrialkoxysilane such as methyltrimethoxysilane, methyltriethoxysilane, ethyltriethoxysilane or n-octyltriethoxysilane, or a dialkoxysilane, for example a dialkyldimethoxysilane such as dimethyldiethoxysilane, or a tetraalkoxysilane such as tetraethoxysilane.

If the polyorganosiloxane polyoxyalkylene block copolymer contains only two Si-bonded alkoxy groups, the organosilicon cross-linking agent should contain more than two Si-bonded alkoxy groups, for example it can be a trialkoxysilane or a polysiloxane containing at least one —Si(OR)$_3$ unit where R is defined as above, or a polysiloxane containing at least two

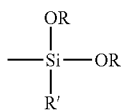

units where R' is an as described above, or a polysiloxane containing at least three

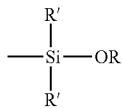

units where R' is as described above.

If the polyorganosiloxane polyoxyalkylene block copolymer contains more than two Si-bonded alkoxy groups, an organosilicon cross-linking agent containing only two Si-bonded alkoxy groups and/or an organosilicon cross-linking agent containing more than two Si-bonded alkoxy groups can be used. Alternatively, such a polyorganosiloxane polyoxyalkylene block copolymer containing more than two Si-bonded alkoxy groups can be cured by reaction of the Si-alkoxy groups with each other in the presence of moisture, and preferably a transition metal catalyst, without need for a further cross-linking agent.

It will be appreciated that some cross-linking between polyorganosiloxane polyoxyalkylene block copolymer chains terminated with reactive groups of the formula

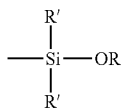

may take place even there is a cross-linking agent present. It may be preferred to use a minor amount of cross-linking agent to control the properties of the cured polymer composition. For example a branched polyorganosiloxane containing Si-alkoxy groups can be added to increase the degree and/or density of cross-links, leading to harder cured polymer composition. An alkoxy-terminated polydiorganosiloxane of relatively high chain length, for example polydimethylsiloxane of D.P. 100 up to 250 or even 500 can be added to decrease the cross-link density, leading to a more flexible cured polymer composition. The overall proportion of alkoxy-functional polyorganosiloxane polyoxyalkylene block copolymer to other alkoxy-functional polyorganosiloxane(s) can be any value in the range 100:0 to 10:90.

For some uses where the curable composition has to be applied in situ, for example as a coating or sealant, it may not be feasible to carry out the cross-linking reaction at elevated temperature. Fortunately a cross-linking reaction via condensation of silicon-bonded alkoxy group proceeds fast at ambient temperature. Such reactions of Si-alkoxy groups with each other may take place in the presence of moisture and a catalyst. A curable composition according to the second aspect of the invention may accordingly also comprise a catalyst which will promote the condensation of the block copolymers with each other or with the cross-linking agents. Additionally the reaction may be conducted with other organosilicon compounds having acetoxy, ketoxime, amide or hydroxyl groups bonded to silicon.

The Si-alkoxy groups react with each other in the presence of moisture to form Si—O—Si linkages. This reaction can proceed, even at ambient temperature, without catalyst, but proceeds much more rapidly in the presence of a siloxane condensation catalyst. Any suitable polycondensation catalyst may be utilised. These include protic acids, Lewis acids, organic and inorganic bases, transition metal compounds, metal salts and organometallic complexes.

The siloxane condensation catalyst can for example comprise a compound of a transition metal selected from titanium, zirconium and hafnium. Preferred titanium compounds are titanium alkoxides, otherwise known as titanate esters. Zirconium alkoxides (zirconate esters) or hafnium alkoxides can alternatively be used. Titanate and/or zirconate based catalysts may comprise a compound according to the general formula $Ti[OR^5]_4$ and $Zr[OR^5]_4$ respectively where each $R^5$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl.

Alternatively, the titanate may be chelated. The chelation may be with any suitable chelating agent such as an alkyl acetylacetonate such as methyl or ethylacetylacetonate. Any suitable chelated titanates or zirconates may be utilised. Preferably the chelate group used is a monoketoester such as acetylacetonate and alkylacetoacetonate giving chelated titanates such as, for example diisopropyl bis(acetylacetonyl) titanate, diisopropyl bis(ethylacetoacetonyl)titanate, diisopropoxytitanium bis(ethylacetoacetate) and the like. Examples of suitable catalysts are additionally described in EP1254192 and WO200149774 which are incorporated herein by reference.

The amount of a transition metal compound such as a titanate ester present as catalyst can for example be 0.01-2% based on the weight of polyorganosiloxane polyoxyalkylene block copolymer plus cross-linking agent.

Further suitable condensation catalysts which may be used as the catalyst for the polymerisation reaction in the present invention include condensation catalysts incorporating tin, lead, antimony, iron, cadmium, barium, manganese, zinc, chromium, cobalt, nickel, aluminium, gallium or germanium. Examples include metal triflates, organic tin metal catalysts such as triethyltin tartrate, stannous octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, dimethyltin dineodeconoate or dibutyltin dioctoate.

The catalyst can alternatively be a Lewis acid catalyst. (a "Lewis acid" is any substance that will take up an electron pair to form a covalent bond), for example, boron trifluoride $FeCl_3$, $AlCl_3$, $ZnCl_2$, $ZnBr_2$, catalysts of formula $M^1R^4_fX^1_g$ where $M^1$ is B, Al, Ga, In or Tl each $R^4$ is independently the same (identical) or different and represents a monovalent aromatic hydrocarbon radical having from 6 to 14 carbon atoms, such monovalent aromatic hydrocarbon radicals preferably having at least one electron-withdrawing element or group such as $—CF_3$, $—NO_2$ or $—CN$, or substituted with at least two halogen atoms; $X^1$ is a halogen atom; f is 1, 2, or 3; and g is 0, 1 or 2; with the proviso that f+g=3. One example of such a catalyst is $B(C_6F_5)_3$.

An example of a base catalyst is an amine or a quaternary ammonium compound such as tetramethylammonium hydroxide. Amine catalysts can be used alone or can be used in conjunction with another catalyst such as a tin carboxylate or organotin carboxylate, for example laurylamine may be particularly effective with such a tin compound.

Since a polyorganosiloxane polyoxyalkylene block copolymer having Si-alkoxy groups and a cross-linking agent having Si-alkoxy groups do not react in the absence of moisture, even in the presence of catalyst, a curable composition based on them can be stored in a single container provided that the reagents are dry and the container is moisture-proof. Upon opening of the container, the curable composition can be applied to a surface and will generally cure in the presence of atmospheric moisture. Cure proceeds rapidly at ambient temperature in the presence of a catalyst, particularly a titanium tetraalkoxide or a chelated titanium alkoxide.

One type of curable composition according to the invention comprises a polyorganosiloxane polyoxyalkylene block copolymer containing Si-alkoxy groups of the formula

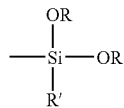

wherein each R represents an alkyl group having 1 to 4 carbon atoms and R' represents an alkyl group having 1 to 6 carbon atoms, a phenyl group, or an alkoxy group of the formula —OR; PO represents a polyoxyalkylene block, A represents a divalent radical and n has a value of at least 1, and a siloxane condensation catalyst, the composition being packed in a moisture-proof container.

The polyorganosiloxane polyoxyalkylene block copolymer terminated with reactive groups of the formula

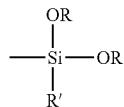

has 2 or 3 reactive Si-bonded alkoxy groups at each end of the block copolymer chain. It does not need to be reacted with a highly functional or branched cross-linker to form a network. The cross-linker used with such a polyorganosiloxane polyoxyalkylene block copolymer can for example be a polydiorganosiloxane, for example a polydimethylsiloxane, terminated with Si-alkoxy groups such as groups of the formula

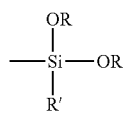

Such an alkoxy-terminated polydiorganosiloxane can be prepared by reaction of a Si—H terminated polydiorganosiloxane with an ethylenically unsaturated alkoxysilane of the formula

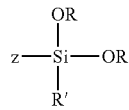

in the presence of a platinum group metal catalyst. The polydiorganosiloxane can for example be a polydimethylsiloxane of D.P. in the range 4 to 500 siloxane units.

The curable composition may also comprise, in addition to the polyorganosiloxane polyoxyalkylene block copolymer, a polyorganosiloxane containing no polyoxyalkylene moieties but having the same reactive silicon-bonded alkoxy groups X. The polyorganosiloxane can for example be a polydiorganosiloxane such as polydimethylsiloxane which is terminated with the reactive groups X. When the cross-linking agent is simultaneously reacted with the polyorganosiloxane polyoxyalkylene block copolymer and the polyorganosiloxane having the same reactive groups X, the polyorganosiloxane is reacted into the water-insoluble hydrophilic polymer network. The proportion of polyorganosiloxane polyoxyalkylene block copolymer to the polyorganosiloxane having the same reactive groups X can be any value in the range 100:0 to 10:90.

The curable compositions of the invention can be unfilled or can contain a reinforcing or non-reinforcing filler. Examples of suitable fillers include silica, including fumed silica, fused silica, precipitated silica, barium sulphate, calcium sulphate, calcium carbonate, silicates (such as talc, feldspar and china clay), bentonite and other clays and solid silicone resins, which are generally condensed branched polysiloxanes, such as a silicone resin comprising Q units of the formula $(SiO_{4/2})$ and M units of the formula $lnSiO_{1/2}$, wherein the R''' substituents are selected from alkyl groups having 1 to 6 carbon atoms and the ratio of M units to Q units is in the range 0.4:1 to 1:1.

A water-insoluble hydrophilic polymer network, provided according to a third aspect of the present invention comprises polyorganosiloxane polyoxyalkylene block copolymer moieties linked to each other by bonds between cross-linking sites on silicon atoms through condensation reaction of silicon-bonded alkoxy groups which were present on the polyorganosiloxane polyoxyalkylene block copolymer prior to network formation and/or through an organosilicon cross-linking moiety bonded to cross-linking sites on silicon atoms through the condensation reaction of silicon-bonded alkoxy groups which were present on the polyorganosiloxane polyoxyalkylene block copolymer moieties and on the organosilicon cross-linking moiety prior to network formation.

A process for forming such hydrophilic polymer networks is also provided according to yet another aspect of the invention and comprises reacting a curable composition according to the second aspect of the invention. This means reacting two or more polyorganosiloxane polyoxyalkylene block copolymer having at least two reactive silicon-bonded alkoxy groups X with each other via condensation reaction, optionally in the presence of an organosilicon cross-linking agent having at least two silicon-bonded alkoxy groups Y reactive with the said groups X, provided that if the polyorganosiloxane polyoxyalkylene block copolymer has only two reactive groups X per molecule the cross-linking agent is present and has on average more than two reactive groups Y per molecule.

The water-insoluble hydrophilic polymer network of the invention can thus comprise polyorganosiloxane polyoxyalkylene block copolymer moieties linked to each other through Si—O—Si linkages derived from Si-alkoxy derived cross-linking sites on silicon atoms of the polyorganosiloxane polyoxyalkylene block copolymers prior to formation of the network, preferably located on polyorganosiloxane blocks of the polyorganosiloxane polyoxyalkylene block copolymers.

The polymer networks produced by curing compositions of the invention are substantially water-insoluble and have unusual hydrophilic properties. The surface of the cured polymer network is somewhat hydrophobic in the dry state, but becomes hydrophilic when the surface is wetted with water or an aqueous liquid. This effect is reversible. When the wetted surface is allowed to dry, it regains its hydrophobic properties, and can be made hydrophilic again by rewetting. Hydrophilic polymer networks with such properties are produced particularly if the sum of the D.P. of the polysiloxane and the D.P. of the polyethylene oxide in the block copolymer are in the range 15 to 35.

This reversible hydrophilicity can be observed by applying droplets of water to the surface and observing the droplets over time. When the droplet is first applied to the surface, it remains as a droplet on the surface and the contact angle of the water on the surface can be measured. This contact angle is typically in the range 60° to 120° when measured 2 seconds after application of the droplet to the surface and is usually still above 60° 30 seconds after application, but the water droplet spreads over time and the contact angle has generally decreased by at least 10° after 3 minutes and continues to decrease; the contact angle is generally below 60° and may be below 30° 10 minutes after application of the droplet indicating a hydrophilic surface. The change from a hydrophobic surface to a more hydrophilic surface is still observed when part of the polyorganosiloxane polyoxyalkylene block copolymer in the polymer network is replaced by a polydiorganosiloxane, although the extent of change, as measured by decrease in contact angle with water, is reduced as the proportion of polyorganosiloxane polyoxyalkylene block copolymer in the polymer network is reduced. When the surface is then dried and a water droplet is applied to the dried surface, the contact angle measured 2 seconds after application of the droplet to the surface is substantially the same as the contact angle measured after the first application of the water droplet, and the contact angle decreases over time at substantially the same rate as after the first application.

The polymer compositions of the invention can be used in various applications in which a polymer surface has to be in contact with water or an aqueous liquid and hydrophilic properties are required. The polymer composition can be applied to a surface as a coating or sealant and cured in situ on the surface to a water-insoluble hydrophilic polymer network. Alternatively the polymer composition can be shaped, for example by extrusion, and then cured to form the polymer network. A polymer composition curing by a hydrosilylation reaction can for example be shaped and then heat cured.

The invention is illustrated by the following Examples in which all parts and percentages are by weight, unless otherwise indicated.

EXAMPLE 1

6.20 g of a polyethylene glycol diallyl ether of average D.P. 4.5 was placed in 31.20 g toluene in a 3 necked flask and heated to 65° C. under nitrogen followed by 165 μl chloroplatinic acid catalyst, then 100 g polydimethylsiloxane fluid by a dimethyldihydrogensilyl terminated polydimethylsiloxane fluid of average D.P. 19 was added dropwise. The molar ratio of SiH groups to allyl groups was 3:1. The mixture was heated for 1 hour at 80° C. then cooled to form a solution of a SiH terminated polysiloxane polyoxyethylene block copolymer of SiH content 2.37%.

100 g of the SiH terminated polysiloxane polyoxyethylene block copolymer thus prepared was placed in 30 g toluene in a 3 necked flask and heated to 65° C. under nitrogen. 37.16 g vinyltrimethoxysilane was added dropwise. The molar ratio of SiH groups to vinyl groups was 1:3. The mixture was heated for 1 hour at 80° C. then cooled to form a solution of a polysiloxane polyoxyethylene block copolymer terminated with $Si(CH_3)_2$—$CH_2CH_2$—$Si(OCH_3)_3$ groups. This block copolymer had a number average molecular weight Mn of 3535 and contained 6.95% by weight methoxy groups.

The Si-methoxy terminated block copolymer of Example 1 was mixed with titanium tetra-n-butoxide catalyst to a level of 0.1% by weight Ti based on block copolymer, applied to a test surface and allowed to cure in a moist atmosphere at ambient temperature. A hydrophilic polymer network was produced.

EXAMPLE 2

A vinyl-terminated Q-branched polysiloxane of the formula

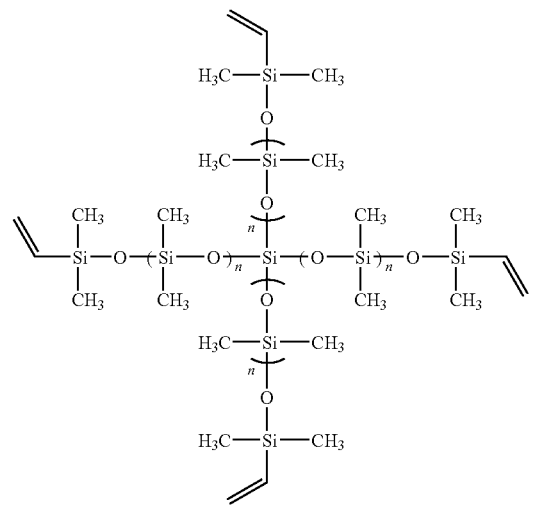

having a total of 4 siloxane D units (i.e. the cumulative total of n per molecule=4) to give a molar ratio of Si:H groups of the SiH terminated polysiloxane polyoxyethylene block copolymer to vinyl groups of 1.4:1.

This vinyl-terminated Q-branched polysiloxane of was reacted with a Si—H terminated trimethoxysilyl-functional polydimethylsiloxane of the form

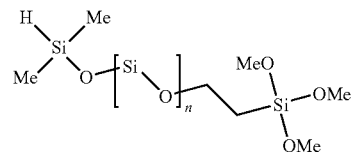

having a D.P. of 4 in the presence of 2% by weight of a platinum vinyl siloxane complex dissolved in a vinyl siloxane copolymer at 0.5% platinum to produce a branched Si-methoxy-functional cross-linker of Mn 1657 and methoxy content 25.55% by weight.

9.09.g of the Si-methoxy terminated block copolymer of Example 1 was blended with 0.91.g of the Si-methoxy terminated branched cross-linker and titanium tetra-n-butoxide catalyst to a level of 0.1% by weight Ti based on total siloxane, and was applied to a test surface and allowed to cure in a moist atmosphere at ambient temperature. A hydrophilic polymer network was produced which was more rigid than the network of Example 1.

EXAMPLES 3 TO 5

Example 2 was repeated, except that the Si-methoxy terminated block copolymer of Example 1 was partly replaced by a Si-methoxy terminated polydimethylsiloxane in weight ratios of 50:50 (Example 3), 30:70 (Example 4) and 10:90 (Example 5). The polydimethylsiloxane was terminated with $Si(CH_3)_2$—$CH_2CH_2$—$Si(OCH_3)_3$ groups and had a similar molecular weight and methoxy content to the block copolymer of Example 1. Each composition cured to a hydrophilic polymer network.

The contact angle of water on each of the cured polymer networks of Examples 2 to 5 was measured over time. A 1 µl water droplet was applied to each surface and the contact angle was measured after 30 seconds and 1, 2 and 3 minutes, and after 5 minutes for Examples 2 and 3. The results are shown in Table 1.

As can be seen from Table 1 (FIG. 3), the contact angle of water on the cured polymers of Examples 2 to 5 decreased over time, from about 95° 30 seconds after application to the surface to about 70° 3 minutes after application to the surface for the cured polymer of Example 2, indicating that the surface was becoming more hydrophilic while it remained in contact with water.

TABLE 1

| Example | Contact angle after 30 sec | Contact angle after 60 sec | Contact angle after 120 sec | Contact angle after 180 sec | Contact angle after 300 sec |
| --- | --- | --- | --- | --- | --- |
| 2 | 95° | 82° | 78° | 72° | 68° |
| 3 | 100° | 97° | 93° | 88° | 81° |
| 4 | 106° | 103° | 102° | 94° | NA |
| 5 | 104° | 101° | 98° | 100° | NA |

EXAMPLE 6

Following the procedure of Example 1, 100 g of the SiH terminated polysiloxane polyoxyethylene block copolymer prepared was reacted with 85.46 g vinyltrimethoxysilane (SiH to vinyl ratio 1:3) to produce a polysiloxane polyoxyethylene block copolymer of Mn 1754 terminated with $Si(CH_3)_2$—$CH_2CH_2$—$Si(OCH_3)_3$ groups and having a methoxy content of 18.47% by weight.

The Si-methoxy terminated block copolymer of Example 6 was mixed with titanium tetra-n-butoxide catalyst to a level of 0.1% by weight Ti, applied to a test surface and allowed to cure in a moist atmosphere at ambient temperature. A hydrophilic polymer network was produced.

EXAMPLE 7

9.03 g of the Si-methoxy terminated block copolymer of Example 6 was blended with 0.97 g of the Si-methoxy terminated branched cross-linker described in Example 2 and titanium tetra-n-butoxide catalyst to a level of 0.1% by weight Ti, and was applied to a test surface and allowed to cure in a moist atmosphere at ambient temperature. A hydrophilic polymer network was produced which was more rigid than the network of Example 6.

EXAMPLES 8 TO 10

Example 7 was repeated, except that the Si-methoxy terminated block copolymer of Example 6 was partly replaced by a Si-methoxy terminated polydimethylsiloxane in weight ratios of 50:50 (Example 8), 30:70 (Example 9) and 10:90 (Example 10). The polydimethylsiloxane was terminated with $Si(CH_3)_2$—$CH_2CH_2$—$Si(OCH_3)_3$ groups and had a similar molecular weight and methoxy content to the block copolymer of Example 6. Each blend was mixed with titanium tetra-n-butoxide catalyst to a level of 0.1% by weight Ti, applied to a test surface and allowed to cure in a moist atmosphere at ambient temperature. Each composition cured to a hydrophilic polymer network.

The contact angle of water on each of the cured polymer networks of Examples 7 to 10 was measured over time as described above. The results are shown in Table 2.

TABLE 2

| Example | Contact angle after 30 sec | Contact angle after 60 sec | Contact angle after 120 sec | Contact angle after 180 sec | Contact angle after 300 sec |
| --- | --- | --- | --- | --- | --- |
| 7 | 98° | 95° | 87° | 84° | 73° |
| 8 | 103° | 102° | 99° | 98° | 91° |
| 9 | 100° | 93° | 92° | 93° | NA |
| 10 | 96° | 91° | 89° | 93° | NA |

As can be seen from Table 2, the contact angle of water on the cured polymer of Example 7 decreased over time, from about 98° 30 seconds after application to the surface to about 72° 5 minutes after application to the surface. The contact angle on the cured polymers of Examples 8 to 10 also decreased, but less markedly.

EXAMPLE 11

100 g dimethylhydrogensilyl terminated polydimethylsiloxane fluid of average D.P. 11.8 was placed in 50 g toluene in a 3 necked flask and heated to 80° C. under nitrogen. 1 drop of polyethylene glycol diallyl ether of average D.P. 7 was added followed by 30 μl chloroplatinic acid catalyst, then 12.76 g of the polyethylene glycol diallyl ether was added dropwise. The molar ratio of SiH groups to allyl groups was 3:1. The mixture was heated for 1 hour at 80° C. then cooled to form a solution of a SiH terminated polysiloxane polyoxyethylene block copolymer of SiH content 2.325%.

100 g of this SiH terminated polysiloxane polyoxyethylene block copolymer was placed in 50 g toluene in a 3 necked flask and heated to 80° C. under nitrogen. 30 μl chloroplatinic acid catalyst was added, then 54.75 g vinyltrimethoxysilane was added dropwise. The molar ratio of SiH groups to vinyl groups was 1:3. The mixture was heated for 1 hour at 80° C. then cooled to form a solution of a polysiloxane polyoxyethylene block copolymer terminated with $Si(CH_3)_2$—$CH_2CH_2$—$Si(OCH_3)_3$ groups. This block copolymer had a number average molecular weight Mn of 2611 and contained 10.26% by weight methoxy groups.

The Si-methoxy terminated block copolymer of Example 11 was mixed with titanium tetra-n-butoxide catalyst to a level of 0.1% by weight Ti based on block copolymer, applied to a test surface and allowed to cure in a moist atmosphere at ambient temperature. A hydrophilic polymer network was produced.

EXAMPLE 12

A SiH terminated polysiloxane polyoxyethylene intermediate block copolymer was prepared by placing 15.43 g of the polyethylene glycol dimethallyl ether of average D.P. 6.7, 73.22 g dimethylhydrogensilyl terminated polydimethylsiloxane fluid of average D.P. 18 and 11.35 g of divinyl terminated polydimethylsiloxane fluid of average D.P. 54 in 25 g toluene in a 3 necked flask and heated to 85° C. under nitrogen followed by 0.1 g of a platinum vinyl siloxane complex catalyst. The weight ratio of EO groups to PDMS groups was 1:5. The mixture was heated for 1 hour at 85° C. then cooled to form a solution of a SiH terminated polysiloxane polyoxyethylene block copolymer.

The block copolymer had a Si—H content of 0.545% and contained residual catalyst. 100 g of the SiH terminated polysiloxane polyoxyethylene block copolymer was placed in 25 g toluene in a 3 necked flask and heated to 85° C. under nitrogen. 7.67 g vinyltrimethoxysilane was added dropwise. The molar ratio of SiH groups to vinyl groups was 1:3. The mixture was heated for 1 hour at 85° C. then cooled to form a solution of a polysiloxane polyoxyethylene block copolymer terminated with $Si(CH_3)_2$—$CH_2CH_2$—$Si(OCH_3)_3$ groups. This copolymer had a number average molecular weight Mn of 10133 and contained 2.48% by weight methoxy groups.

The Si-methoxy terminated copolymer was then mixed with di-butyl tin di laureate (DBTDL) catalyst to a level of 1.5% and TEOS (tetraethyl orthosilicate) cross linker to a level of 7% by weight based on copolymer, applied to a test surface and allowed to cure in a moist atmosphere at ambient temperature. A hydrophilic polymer network was produced.

The contact angle of water on the cured polymer network was measured over time as described above. The results are shown in Table 3. As can be seen from Table 3, the contact angle of water on the cured polymer network decreased over time, from about 113° 5 seconds after application to the surface to about 53° 5 minutes after application to the surface.

TABLE 3

| Example | Contact angle after 30 sec | Contact angle after 60 sec | Contact angle after 120 sec | Contact angle after 180 sec | Contact angle after 300 sec |
|---|---|---|---|---|---|
| 12 | 113° | 74° | 65° | 64° | 53° |

The invention claimed is:

1. A polymer composition curable to a water-insoluble hydrophilic polymer network, said composition comprising a polyorganosiloxane polyoxyalkylene block copolymer of the form PS-(A-PO-A-PS)$_n$, wherein PS represents a polydimethylsiloxane block having from 4 to 40 siloxane units terminated with an alkoxy-substituted siloxane unit which is linked via oxygen to another silicon atom of the PS block and which has the formula

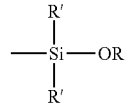

wherein R represents an alkyl group having 1 to 4 carbon atoms and each R' represents an alkyl group having 1 to 6 carbon atoms, a phenyl group, or an alkoxy group of the formula —OR, PO is a polyoxyalkylene block having the general formula —$(C_sH_{2s}O)_t$—where each s independently has a value of from 2 to 6 and t has a value of from 4 to 40, with the proviso that at least 50% of the polyoxyalkylene units in the polyoxyalkylene block are oxyethylene units, A is a divalent radical having from 2 to 10 carbon atoms, n has a value of at least 1, and the molar ratio of oxyalkylene units to siloxane units in the polyorganosiloxane polyoxyalkylene block copolymer is in the range 0.05:1 to 0.5:1, and a branched polyorganosiloxane cross-linking agent comprising one or more siloxane Q units of the formula ($SiO_{4/2}$), 0 to 250 D units of the formula $R^b{}_2SiO_{2/2}$ and M units of the formula $R^a{}_3SiO_{1/2}$ wherein the $R^a$ $R^b$ and $R^c$ substituents are selected from alkyl and alkoxy groups having 1 to 6 carbon atoms, at least three $R^a$, $R^b$ and/or $R^c$ substituents being alkoxy units.

2. A curable polymer composition according to claim 1, which further comprises a condensation catalyst selected from the group consisting of protic acids, Lewis acids, organic and inorganic bases, transition metal compounds, metal salts and organometallic complexes.

3. A curable polymer composition according to claim 2, wherein the siloxane condensation catalyst comprises a compound of a transition metal selected from titanium, zirconium and hafnium.

4. A curable polymer composition according to claim 3, wherein the catalyst is a titanium tetraalkoxide or chelated titanium alkoxide.

5. A curable polymer composition according to claim 2, wherein the siloxane condensation catalyst comprises an organic compound of tin.

6. A curable polymer composition according to claim 1, which further comprises a contain a filler selected from the group consisting of silica, fumed silica, fused silica, precipitated silica, barium sulphate, calcium sulphate, calcium carbonate, silicates, talc, feldspar, china clay, bentonite, and and solid silicone resins.

7. A curable polymer composition according to claim 1, wherein the composition contains a siloxane condensation catalyst and in that the composition is packed in a moisture-proof container.

* * * * *